(12) United States Patent  (10) Patent No.: US 6,702,058 B2
Ishii et al.                    (45) Date of Patent:     Mar. 9, 2004

(54) VEHICLE BODY FRAME STRUCTURE AND MANUFACTURING METHOD OF SAME

(75) Inventors: Keiichiro Ishii, Hamamatsu (JP); Takuji Nozue, Hamamatsu (JP); Hiroto Yao, Hamamatsu (JP); Eizo Aoki, Hamamatsu (JP); Naoyuki Hamada, Hamamatsu (JP); Tomoyuki Mizuno, Hamamatsu (JP); Hirofumi Takeda, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 11 days.

(21) Appl. No.: 10/173,861

(22) Filed: Jun. 19, 2002

(65) Prior Publication Data
    US 2003/0001377 A1 Jan. 2, 2003

(30) Foreign Application Priority Data
    Jun. 29, 2001 (JP) ........................... 2001-198348

(51) Int. Cl.$^7$ ............................................. B62D 21/05
(52) U.S. Cl. ................. 180/311; 180/312; 180/908; 280/781; 280/785; 280/788; 296/203.01
(58) Field of Search ................. 180/311, 312, 180/908; 280/781, 785, 788; 296/203.01

(56) References Cited

U.S. PATENT DOCUMENTS

| 4,535,869 A | * | 8/1985 | Tsutsumikoshi et al. .... 180/311 |
| 4,667,765 A | * | 5/1987 | Tomoyuki ................... 180/311 |
| 4,770,262 A | * | 9/1988 | Yasunaga et al. .......... 180/68.1 |
| 4,881,756 A | * | 11/1989 | Kumasaka et al. ......... 280/785 |
| 5,330,028 A | * | 7/1994 | Handa et al. ............... 180/219 |
| 5,401,056 A | * | 3/1995 | Eastman ....................... 280/785 |
| 5,575,352 A | * | 11/1996 | Suzuki et al. ............... 180/311 |
| 5,699,872 A | * | 12/1997 | Miyakawa et al. ......... 180/291 |
| 5,855,250 A | * | 1/1999 | Nishi .......................... 180/312 |
| 5,934,397 A | * | 8/1999 | Schaper ..................... 180/65.2 |
| 5,975,624 A | * | 11/1999 | Rasidescu et al. ..... 296/203.01 |
| 6,412,856 B1 | * | 7/2002 | Kajikawa et al. ...... 296/203.01 |
| 6,523,634 B1 | * | 2/2003 | Gagnon et al. ............. 180/291 |
| 6,547,027 B1 | * | 4/2003 | Kalhok et al. .............. 180/312 |
| 2001/0027890 A1 | * | 10/2001 | Bria et al. ................... 180/291 |
| 2002/0112907 A1 | * | 8/2002 | Maeda et al. ............... 180/69.4 |
| 2002/0117843 A1 | * | 8/2002 | Rasidescu et al. .......... 280/781 |
| 2002/0185326 A1 | * | 12/2002 | Mercier ....................... 180/311 |
| 2003/0000764 A1 | * | 1/2003 | Seiki .......................... 180/376 |
| 2003/0006081 A1 | * | 1/2003 | Burke et al. ................ 180/233 |

* cited by examiner

*Primary Examiner*—Michael J. Carone
*Assistant Examiner*—Troy Chambers
(74) *Attorney, Agent, or Firm*—Oblon, Spivak, McClelland, Maier & Neustadt, P.C.

(57) ABSTRACT

A vehicle such as straddle type suitable for running on a rough has a front wheel, which is steered, disposed in front of a vehicle body frame and a rear wheel disposed to the rear side thereof. Such vehicle is provided with a vehicle body frame structure which comprises a front frame unit, a center frame unit, and a rear frame unit. These front and center and rear frame units are first assembled individually as a unit and then coupled together integrally as a vehicle body frame structure.

11 Claims, 7 Drawing Sheets

VEHICLE BODY FRAME STRUCTURE AND MANUFACTURING METHOD OF SAME

BACKGROUND OF THE INVENTION

The present invention relates to a body frame structure of a vehicle, particularly of a straddle-type vehicle for traveling on rough ground and also relates to a method of manufacturing the same.

A straddle-type vehicle is generally a small-sized vehicle suitable for traveling on a rough ground, and such vehicle is, for example, provided with a front wheel and a lateral pair of rear wheels. A rider straddles a rider's seat positioned at an upper portion of a vehicle body frame and steers a front wheel by operating a steering handle, and the vehicle runs through the driving of an engine mounted to the vehicle body frame.

Such body frame or frame structure of a vehicle is usually composed by interconnecting, by using coupling members, a plurality of lateral paired pipe or tube members each extending from the front portion towards the central portion of the vehicle so as to provide an integral frame structure, and then, a support bracket of a suspension device of a wheel or a reinforcing bracket is welded.

However, in the case of the frame structure of the vehicle body mentioned above, it is difficult to access or insert a welding torch or like into a frame structure at the time of welding a bracket or like member to the frame structure at the inside thereof and also difficult to automatically carry out the welding process by, for example, utilizing a robot. Thus, it is difficult to provide a good welding performance, which may increase working cost.

Moreover, since the brackets or like are welded after the construction of the frame structure, it is also difficult to reform deformation caused after the welding.

Furthermore, it is necessary to newly prepare a welding jig or like every time the change or modification of a specification or a model of an engine to be mounted or suspension stroke, which requires an increased cost.

SUMMARY OF THE INVENTION

An object of the present invention is to substantially eliminate defects or disadvantages encountered in the prior art mentioned above and to provide a vehicle body frame having an improved structure suitable for easy assembling and manufacturing thereof and for achieving improved workability.

This and other objects can be achieved according to the present invention, in one aspect, by providing a frame structure of a body of a vehicle in which a front wheel, which is steered, is disposed in front of a vehicle body frame and a rear wheel disposed to the rear side thereof, an engine is arranged between the front and rear wheels, and a rider's seat is disposed at a rear upper portion of the vehicle body frame, said vehicle body frame structure comprising:

a front frame unit provided with a support member for a front wheel suspension device and a support member for a steering shaft;

a center frame unit provided with a support member for a rear wheel suspension device and an engine mounting member; and a rear frame unit supporting the rider's seat, the front, center and rear frame units being assembled respectively individually and then coupled together integrally.

Further, it is to be noted that term "front", "rear", "upper", "lower" and the like used herein are referred with reference to a vehicle in a normal standing (running) state or a state illustrated in the accompanying drawings which will be mentioned hereinlater.

In a preferred embodiment, the front frame unit comprises a lateral pair of flat front main frame members and a coupling member disposed so as to bridge the front main frame members, the support member of the front wheel suspension device is mounted to the front main frame members, and the support member of the steering shaft is mounted to the coupling member of the front frame unit.

The center frame unit also comprises a lateral pair of flat center main frame members, each having a horizontally curved U-shape so as to surround the engine from a vertical side and a rear side, and a coupling member disposed between the center main frame members so as to integrally couple the center main frame members, the support member of the rear wheel suspension device is provided for the center main frame members and the engine mounting member is provided for the coupling member disposed between the center main frame members.

The center main frame members include center lower tubes, respectively, which have rear half portions extending obliquely rearward upward, rear ends of the extended rear half portions of the center lower tubes are connected to substantially central lower portions of seat rail tubes constituting the rear frame unit to thereby constitute the rear half portions of the center lower tubes as support members of the seat rail tubes, and a rear cushion bracket supporting a rear cushion unit of the rear wheel suspension device is provided for a coupling member disposed so as to bridge rear end portions of the center lower tubes. The front frame unit includes coupling members disposed to vertical rear end portions of the front main frame members so as to connect the front main frame members and the vertical front end portions of the center main frame members of the center frame unit are coupled to the front frame unit through the coupling members of the front frame unit.

The front main frame members of the front frame unit are connected, at an upper end thereof, to each other through the upper coupling member, to which the support member of the steering shaft is attached. Furthermore, the front main frame members of the front frame unit are connected, at a lower end thereof, to each other through the lower coupling member, to which the engine mounting member is attached.

A lateral distance of the lower portion of the center frame unit is formed to be wider than a lateral distance of the lower portion of the front frame unit, the lower rear end portions of the front main frame members are connected to inside portions at both ends of the lower coupling member, the lower front end portions of the center frame unit are disposed so as to extend forward from the lower coupling member, the lower front portion of the center frame unit is bent inside in a width direction thereof, and the front end portion of the bent portion is connected to the rear end of the lower portion of the center frame unit from the outside in the width direction so that the connecting portions between the lower portion of the front frame unit, the lower portion of the center frame unit and the lower coupling member provide substantially a triangular shape in a plan view.

In another aspect, there is also provided a method of manufacturing a body frame structure of a vehicle in which a front wheel, which is steered, is arranged in front of a vehicle body frame, a rear wheel is arranged on a rear side of the vehicle body frame, an engine is arranged between the front and rear wheels, and a rider's seat is disposed at a rear upper portion of the vehicle body frame, the manufacturing method comprising the steps of:

preparing a front frame unit provided with a support member of a front wheel suspension device and a support member of a steering shaft, center frame unit provided with an engine mounting member and a rear frame unit supporting the rider's seat, the front, center and rear frame units being assembled independently; and coupling integrally these front, center and rear frame units after being assembled independently.

In this method, the front frame unit is composed of a pair of lateral flat front main frame members which are coupled through a coupling member disposed therebetween after mounted with a bracket, a stay, a reinforcing member and the like member. The center frame unit is also composed of a pair of lateral flat front main frame members which are coupled through a coupling member disposed therebetween after mounted with a bracket, a stay, a reinforcing member and the like member.

According to the embodiments of the present invention mentioned above,

The vehicle body frame (structure) is constructed by coupling the front frame unit, the center frame unit and the rear frame unit, which are preliminarily independently assembled per each unit and then assembled and coupled together. According to such assembling or manufacturing method, since each of the frame units is relatively small size, a welding torch or like jig is easily assessed and inserted inside the unit at the time of welding the respective frame units, and making possible to operate automatically such as by utilizing a welding robot, thus improving welding, assembling and like workability and reducing manufacturing cost.

Moreover, since the respective frame units are independently assembled and then coupled together, it is not necessary to move or transfer the frame, as the entire frame structure, having relatively large size at an intermediate working time, thus reducing working labor.

Furthermore, since the frame structure is coupled (for example, welded) after the respective frame units have been assembled, less welding strain is caused after the welding and, if caused, such welding strain will be easily removed.

Still furthermore, even in a case where the design change or modification of specification of, for example, an engine or a suspension stroke of a vehicle be required, it is not necessary to disassemble or change all the frame units and necessary only to change a required one frame unit, improving the working performance.

Moreover, the front and center frame units are composed by a lateral pair of flat front main frame members, center main frame members and a plurality of coupling members disposed between these members. The respective main frame members are coupled together after the assembling of brackets, stays, reinforcing members and the like members, so that the working efficiency in the welding, assembling and like workings can be improved and automatic welding will be advantageously applicable.

Furthermore, since the support members of the steering shaft are provided for the coupling members connecting the lateral front main frame members, the axis of the steering shaft can be easily adjusted and the remedy of the welding strain can be also easily made.

Still furthermore, since the center lower tube, the front lower tube and the front engine mounting tube are connected so as to provide substantially a triangular shape in a plane view, the rigidity of the vehicle body frame structure can be made strong.

The nature and further characteristic features of the present invention will be made more clear from the following descriptions with reference to the accompanying drawings.

DESCRIPTION OF THE PREFERRED EMBODIMENT

An embodiment of the present invention will be described hereunder with reference to the accompanying drawings.

Figure 1:
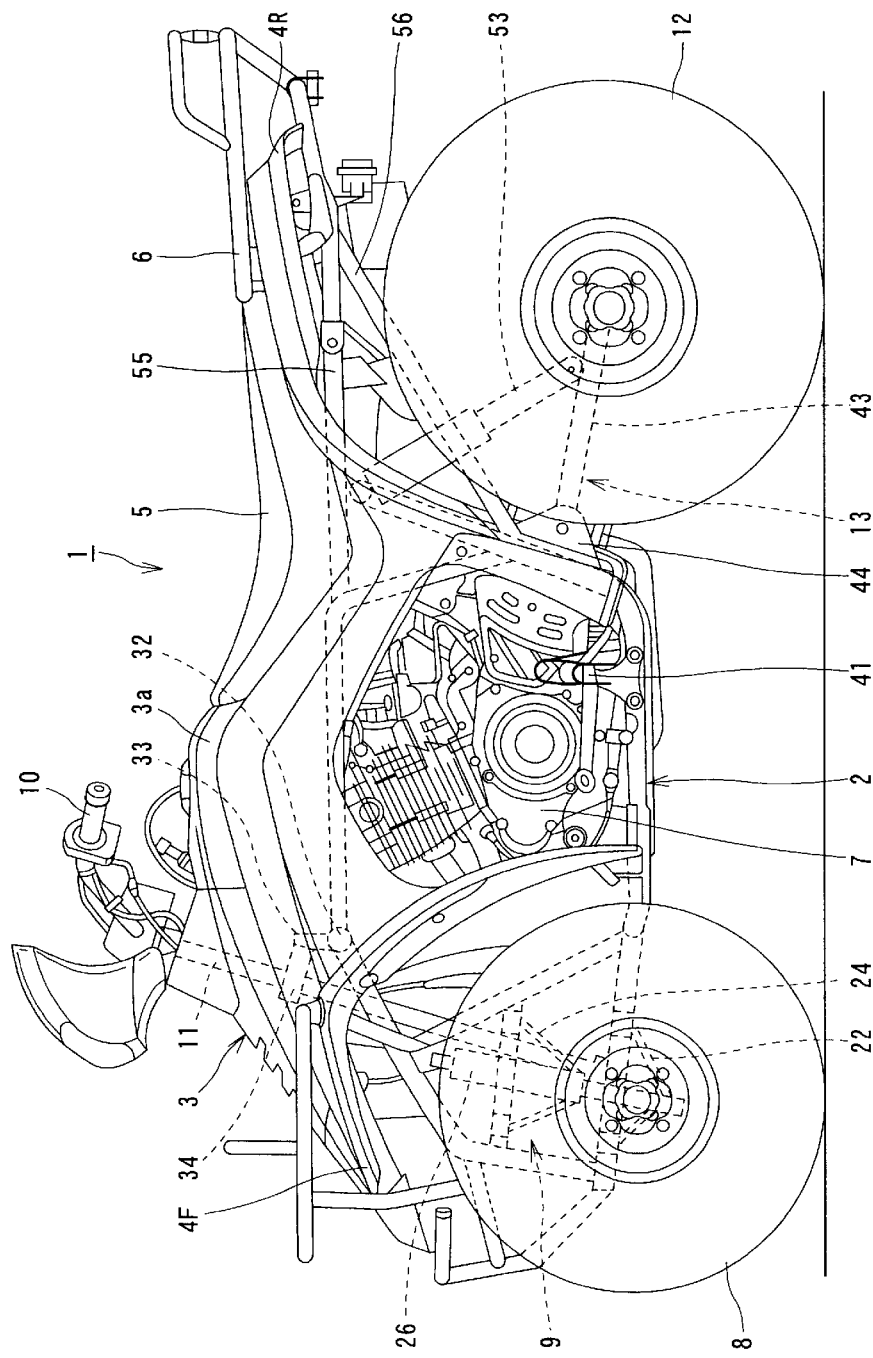
FIG. 1 is a left-side view of a straddle-type vehicle for traveling on a rough ground provided with an improved frame structure (vehicle body frame structure) according to an embodiment of the present invention.

First, with reference to FIG. 1, showing a left-side view of a straddle-type vehicle suitable for traveling on a rough surface, a vehicle 1 is provided with a body frame or body frame structure 2. The frame structure 2 has an upper portion covered by a body cover 3 which is disposed integrally with the frame structure 2 or independently therefrom. The body cover 3 has a front fender 4F and a rear fender 4R formed respectively to font and rear portions thereof.

Further, it is to be noted that terms "upper", "lower", "front", "rear" and the like used herein are made with reference to the illustration of the accompanying drawings or in the state that the frame structure is assembled to a body of vehicle which is in a standing state for running, in which a traveling direction is of course mentioned as "front" or "forward".

The body cover 3 is formed with a tank cover 3a covering a fuel tank, not shown, disposed to a front side portion of the body cover 3, and a rider's seat 5 is disposed at a rear portion of the tank cover 3a. A cargo bed 6 is also arranged at a rear portion of the rider's seat 5, and an engine 7 is arranged at a central lower portion of the body frame 2.

A lateral pair of front wheels 8 are arranged in front of the engine 7 of the body frame 2. These front wheels 8 are provided with low-pressure wide-width tires and suspended to be vertically swingable by a front wheel suspension mechanism 9. Further, a steering handle 10 is disposed in front of the tank cover 3a so that the front wheels 8 are steered laterally by this steering handle 10 through a steering shaft 11, the steering handle 10 and the steering shaft constituting a front wheel steering device.

On the other hand, a lateral pair of rear wheels 12, as driving wheels, are also disposed to a rear portion of the engine 7. These rear wheels 12 are provided with low-pressure wide-width tires and suspended to be vertically swingable by a rear suspension mechanism 13.

Figure 2:
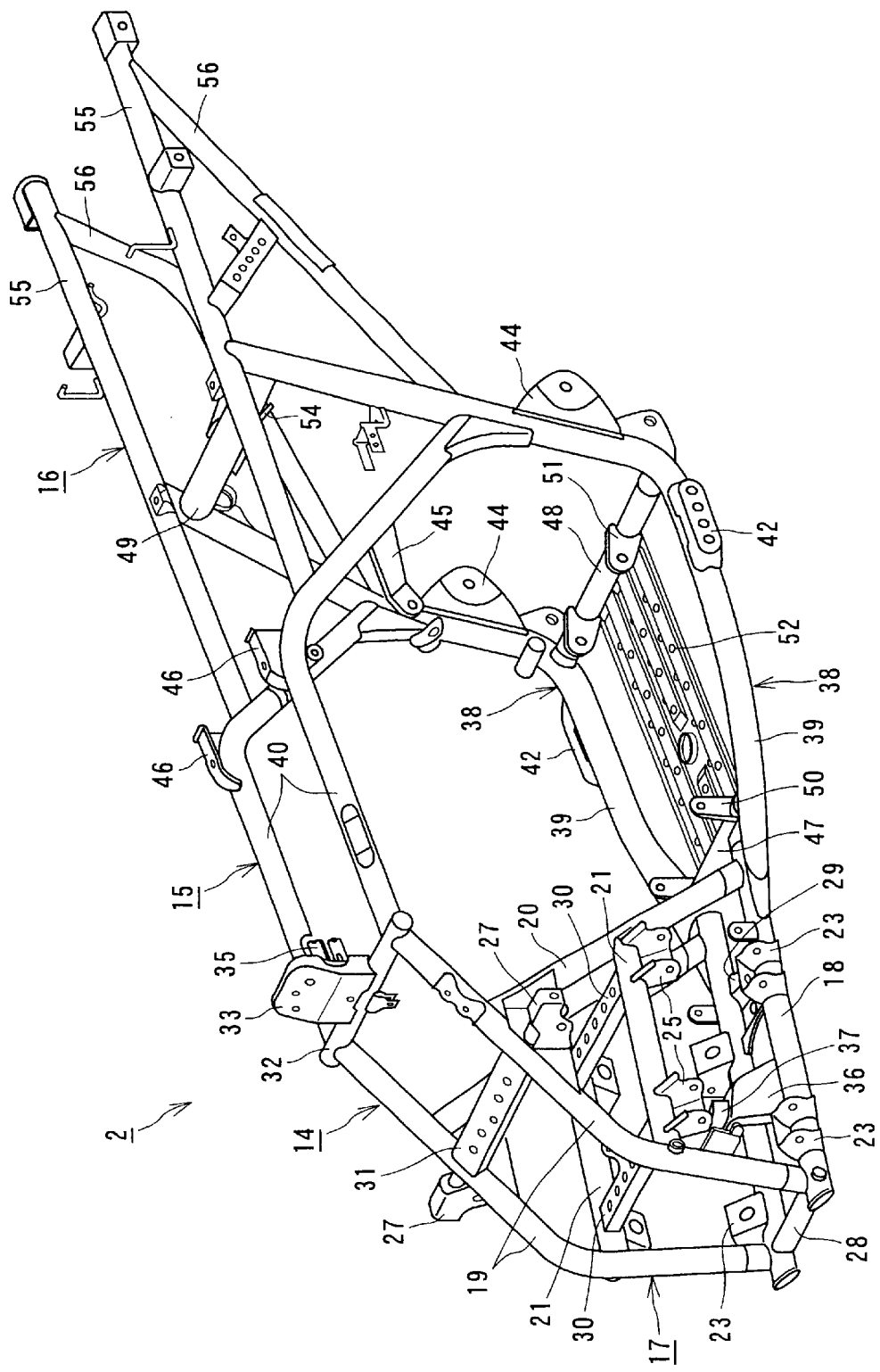
FIG. 2 is a perspective view of the frame structure of the vehicle of FIG. 1 as viewed from a left forward side.

Next, with reference to FIG. 2, being a perspective view of the frame structure 2, viewed from the left obliquely forward side, the frame structure 2 is composed in combination of a plurality of, for example, steel pipes and comprises a front (side) frame unit 14, a central (side) frame unit 15 and a rear (side) frame unit 16, each of which is first assembled as a unit body. Thereafter, these frame units are coupled and assembled into integral one frame structure so as to extend longitudinally along the body of the vehicle 1.

Figure 3:
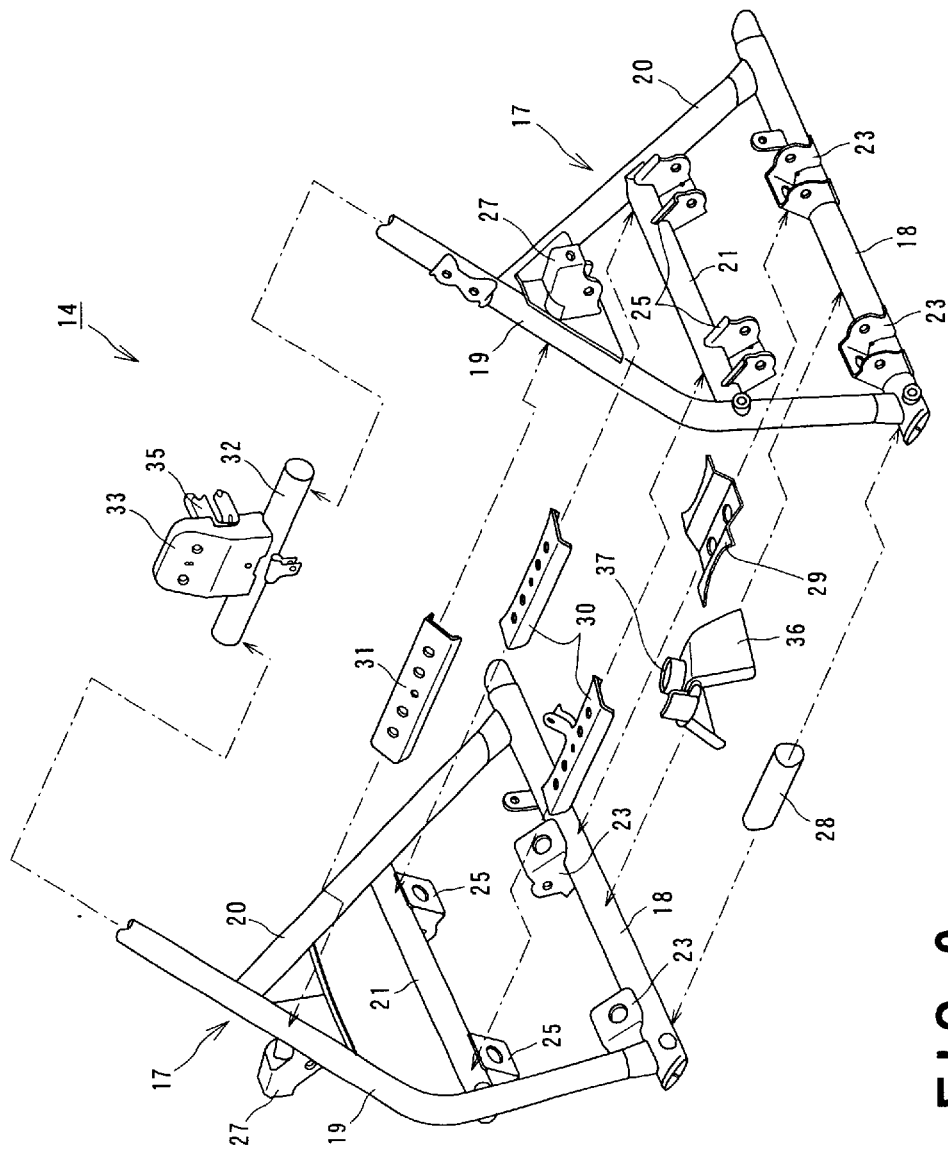
FIG. 3 is a developed view of a front-side unit of the frame structure.

FIG. 3 is a developed view of the front frame unit 14, and as shown in FIGS. 2 and 3, the front frame unit 14 is composed of a lateral pair of flat front main frame members 17 and a plurality of coupling members disposed between these front main frame members 17.

Each front main frame member 17 is composed of a front lower tube 18, a front upper tube 19, a front down tube 20 and a front cushion tube 21, which are assembled into a frame structure by means of welding, for example. More in detail, the front upper tube 19 extends upwards, in a state shown in FIG. 3, from a front end of the front lower tube 18 and is then bent obliquely so as to extend rearward. The front down-tube extends from a portion near a rear end of the front upper tube 19 towards a rear end of the front lower tube 18. The front cushion tube 21 is disposed above the front lower tube 18 to be parallel thereto and arranged so as to respectively connect substantially central portions of the front upper tube 19 and front down-tube 20.

Further, there is located, to the front lower tube 18, a pair of longitudinal lower cushion arm brackets 23 as a supporting member of the front wheel suspension device 9 which supports, to be rotatable, a base end portion of a lower cushion arm 22 (FIG. 1) constituting a member of the front wheel suspension device 9.

Furthermore, there is disposed, to the front cushion tube 21, a pair of longitudinal upper cushion arm brackets 25 as another supporting member of the front wheel suspension device 9 which supports, to be rotatable, a base end portion of an upper cushion arm 24 (FIG. 1) constituting a member of the front wheel suspension device 9.

Still furthermore, there is also arranged, to a portion near the joint portion of the front upper tube 19 and the front-down tube 20, a front cushion unit bracket 27 as a further supporting member of the front wheel suspension device 9 supporting, to be rotatable, an upper end portion of a front cushion unit 26 (FIG. 1) constituting a member of the front wheel suspension device 9.

The respective front main frame members 17, 17 are connected by coupling members after the assembling of the above-mentioned brackets, stays and reinforcing members, which may be not clearly shown. More specifically, for example, a lower bridge tube 28 is arranged between front end portions of the lateral front lower tubes 18, 18 of the respective front main frame members 17, 17, and a lower bridge plate 29 is disposed at substantially central portions of the front lower tubes 18, 18. Furthermore, two longitudinal center bridge plates 30, 30 are disposed between the front cushion tubes 21, 21 of both the front main frame members 17, 17. An upper bridge plate 31 is disposed at substantially central portions of the front upper tubes 19, 19 of both the frame members 17, 17, and rear end portions of the front upper tubes 19, 19 are connected to both end portions of a steering shaft tube 32 extending in the body width direction of the vehicle 1 (FIG. 2).

With reference to FIG. 2, an upper steering shaft plate 33 as a supporting member for the steering shaft is arranged to a central upper portion of the steering shaft tube 32. The upper steering shaft plate 33 constitutes a mounting base of an upper boss 34 (FIG. 1) as a steering shaft support member and also constitutes a fuel tank front portion mounting base 35.

Further, a lower steering shaft plate 36 is also arranged so as to cross the lateral front lower tubes 18, 18 at a portion between the lower front bridge tube 28 and the lower bridge plate 29. The lower steering shaft plate 36 is provided with a mount base of a lower boss 37 as another supporting member of the steering shaft supporting the lower portion of the steering shaft 11 to be rotatable.

On the other hand, with reference to FIG. 2, the center frame unit 15 is provided with a pair of center main frame members 38, 38, each of which is formed so as to provide a horizontally inverted U-shape having upper, lower and rear sections so as to surround the upper, lower and rear portions of the engine 7. Furthermore, each center main frame member 38 is a frame member formed by welding a rear portion of a center lower tube 39 disposed below the engine 7 and a rear portion of a center upper tube 40 disposed above the engine 7 so as to provide a front side opening in the welded state.

Figure 4:
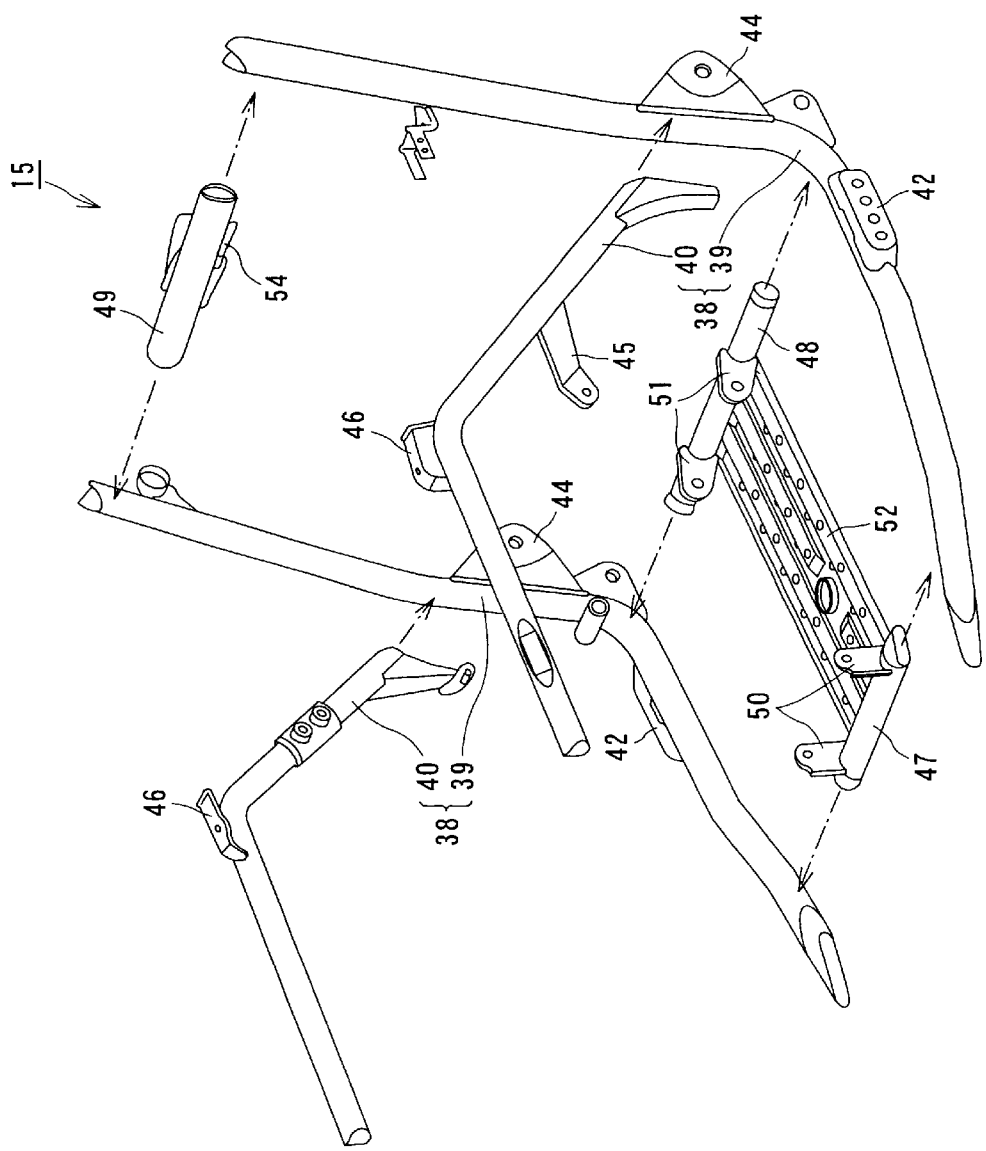
FIG. 4 is a developed view of a central-side unit of the frame structure.

That is, with reference to FIG. 4, being the developed view of the center frame unit 15, the center frame unit 15 is formed as a frame structure having a pair of lateral center main frame members 38, 38, each having a flat shape, which are connected through a plurality of coupling members arranged therebetween.

The center main frame member 38 includes a center lower tube 39 having a front half portion disposed horizontally in the state illustrated in FIG. 4 (i.e., usual travelling state of the vehicle) and a rear half bent at its meddle portion so as to extend obliquely rearward in an upward direction. A mount bracket 42 for mounting a footrest 41 (FIG. 1) is formed to a rear side portion of the front half portion of the center lower tube 39, and furthermore, at a rear side portion of the rear half bent portion, a pivot plate 44, as a support member for the rear wheel suspension device 13, for supporting, to be pivotal, a base end of a swing arm 43 (FIG. 1) constituting one member of the rear wheel suspension device 13.

On the other hand, the center main frame member 38 also includes a center upper tube 40 having a front half portion disposed horizontally in the state illustrated in FIG. 4 and a rear half bent at its middle portion so as to extend obliquely rearward in a downward direction. An engine suspension bracket 45 supporting the engine 7 is disposed to the middle portion of the rear half portion of the center upper tube 40, and at an upper portion of the bent portion, there is provided a mount member 46 for mounting a rear portion of the fuel tank, not shown. The rear end portion of the center upper tube 40 is secured to a front portion of substantially the central portion of the rear half portion of the center lower tube 39 so as to provide an integral structure.

The respective central main frame members 38, 38 are connected by coupling members after the assembling of the above-mentioned brackets, stays and reinforcing members, which may be not clearly shown. More specifically, for example, a front engine mounting tube 47 is disposed between front end portions of the bilateral central lower tubes 39, 39, and a rear engine mounting tube 48 is also disposed between the bent portions of the central lower tubes 39, 39. A rear bridge tube 49 is further disposed between the rear end portions of the center lower tubes 39, 39.

With further reference to FIG. 4, a front engine mounting bracket 50 as an engine mounting member is disposed on a front engine mounting tube 47 so as to hold the front lower portion of the engine 7, and a rear engine mounting bracket 51, also as an engine mounting member, is disposed on a rear engine mounting tube 48 so as to hold the rear lower portion of the engine 7. An engine protector plate 52 is further arranged between the front and rear engine mounting tubes 47 and 48.

Furthermore, a rear cushion unit bracket 54 for supporting, to be pivotal, an upper end portion of the rear cushion unit (FIG. 1) for elastically supporting the swing arm 43 is disposed to the rear bridge tube 49. This rear cushion unit bracket 54 constitutes a member of the rear wheel suspension device 13.

Figure 5:
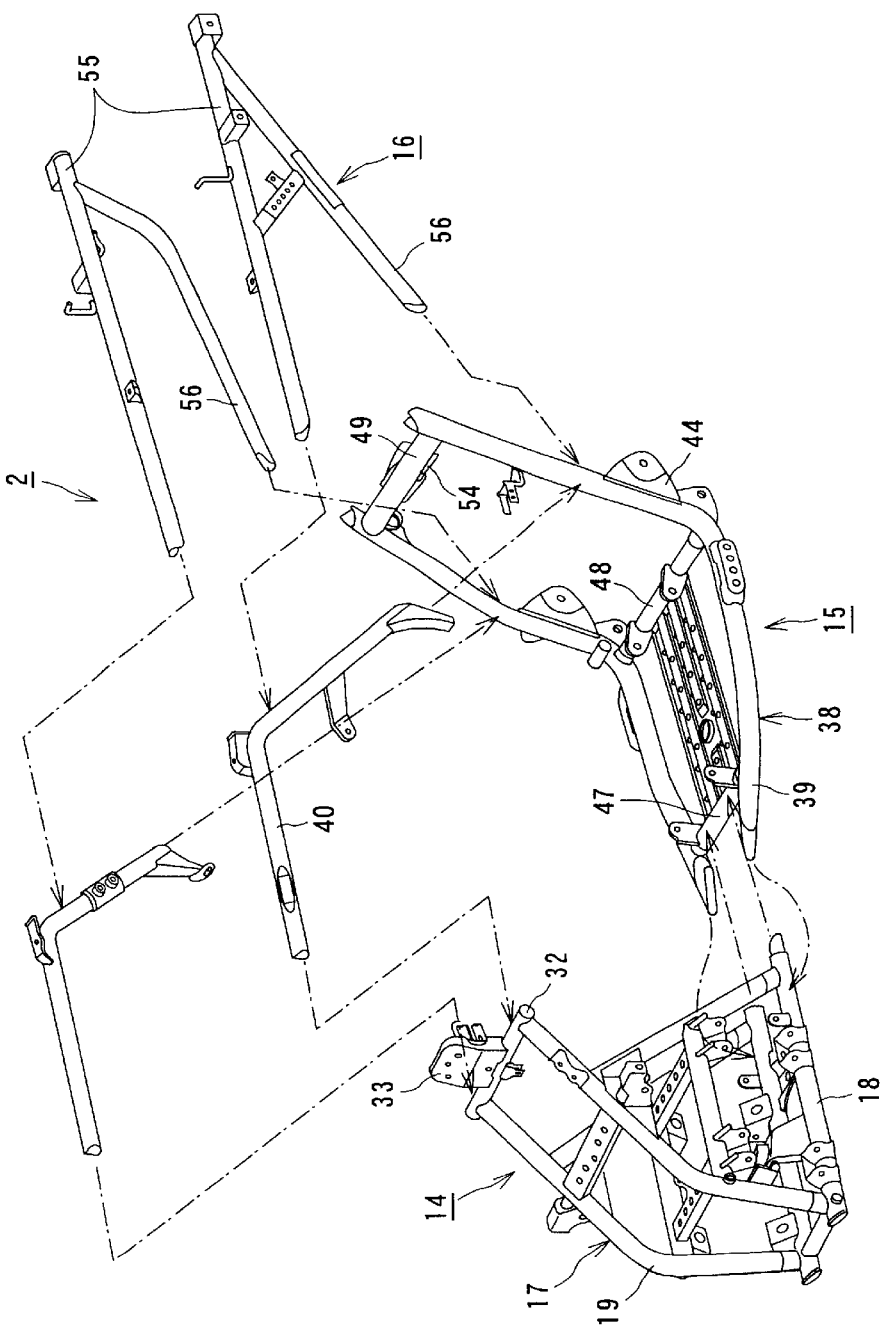
FIG. 5 is a developed view of the entire frame structure.

FIG. 5 is a developed (assembling) view of the vehicle body frame 2, and with reference to FIGS. 2 and 5, the rear frame unit 16 and the center frame unit 15 are connected. More specifically, the rider's seat 5 is supported from its bottom side (FIG. 1) by a lateral pair of seat rail tubes 55, 55, and front end portions of these tubes 55, 55 are connected to portions near the bent portions of the center upper tubes 40, 40 constituting the center main frame members 38, 38 of the center frame unit 15 so as to extend horizontally rearward.

Further, rear end portions of the center lower tubes 39, 39 constituting the center main frame members 38, 38 are connected to substantially the central lower portions of the seat rail tubes 55, 55, respectively, and rear half portions of the center lower tubes 39, 39 act as seat pillars as supporting members. Furthermore, rear side frame tubes 56, 56 extend obliquely from the rear end portions of the seat rail tubes 55, 55 in the forward downward direction and secured to the rear side portions of the central portions of the center lower tubes 39, 39, respectively.

The front frame unit 14 is coupled to the center frame unit 15. More specifically, the front end portions of the upper tubes 40, 40 constituting the center main frame members 38, 38 are connected to both the end portions of the steering shaft tube 32 connecting to the upper rear ends of the front main frame members 17, 17 of the front frame unit 14. Furthermore, the rear end portions of the front lower tubes 18, 18 of the front main frame members 17, 17 of the front frame unit 14 are connected to both end portions of the front engine mounting tube 47 connected to the lower front end portions of the center main frame members 38, 38 of the center frame unit 15. The front end portions of the center lower tubes 39, 39 of the center main frame members 38, 38 to the rear end side portions of the front lower tubes 18, 18 from the outer sides thereof in its width direction.

Figure 6:
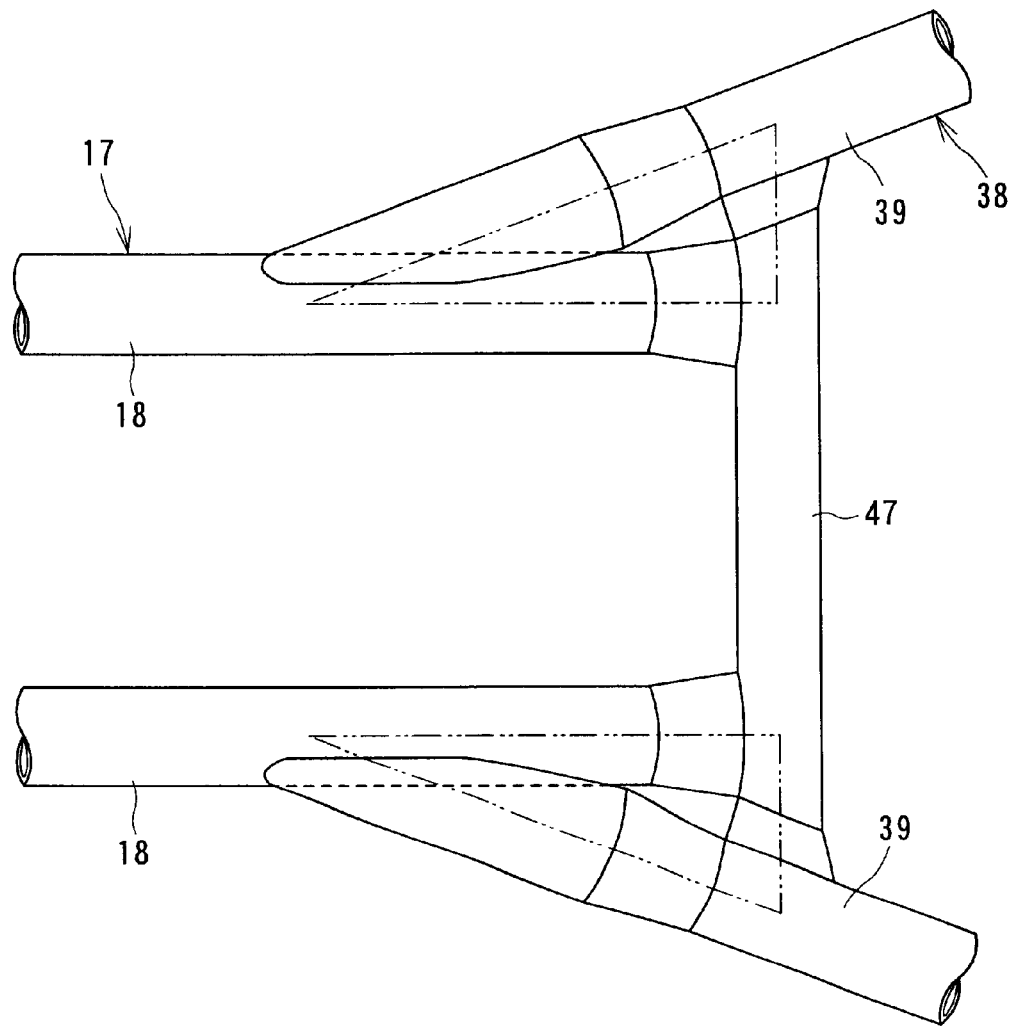
FIG. 6 is a plan view, in an enlarged scale, showing a connection portion of the vehicle frame structure.

FIG. 6 is an enlarged plan view showing the connected condition of the center lower tubes 39 of the center main frame members 38 and the front lower tubes 18 of the front main frame members 17 to the front engine mounting tube 47. With reference to FIGS. 5 and 6, the lateral width of the center lower tubes 39 is designed to be wider than that between the front lower tubes 18, 18, and the rear end portions of the front lower tubes 18 are connected to the front engine mounting tube 47 at portions inside the connected end portions of the front engine mounting tube 47.

The front end portions, right-hand ends as viewed in FIG. 6, of the center lower tubes 39 extend forward over the front engine mounting tube 47, and the front end portions of the center lower tubes 39 are also bent inward in the width direction of the frame structure so that the front ends thereof are to be joined to the rear end side portions of the front lower tubes 18 from the outside portions in the width direction, respectively. According to such structure, the connected portion of the center lower tubes 39 of the center main frame members 38 and the front lower tubes 18 of the front main frame members 17 to the front engine mounting tube 47 can provide substantially a triangular shape in a plan view thereof.

Incidentally, in the structure of the described embodiment, although the steering tube 32 is mounted to the front frame unit 14 and the front engine mounting tube 47 is mounted to the center frame unit 15, it may be possible to mount the front engine mounting tube 47 to the front frame unit 14 and mount the steering shaft tube 32 to the center frame unit 15, and furthermore, both the tubes 32 and 47 may be mounted to either one of the front and center frame unit 14 or 15.

Figure 7:
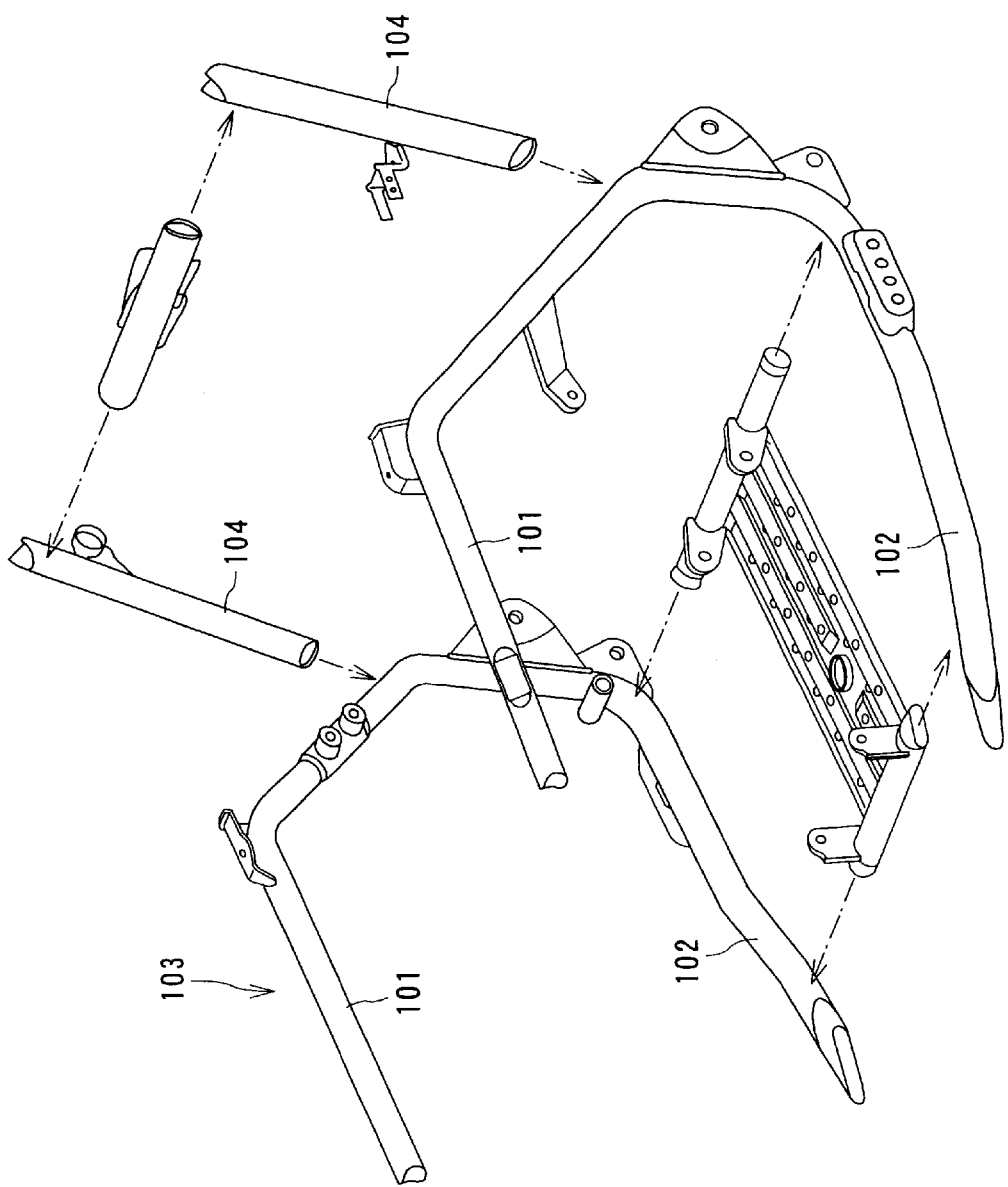
FIG. 7 is a developed view of another example of the central-side unit of the frame structure.

Still furthermore, in the illustrated and described embodiment, each center main frame member 38 constituting the center frame unit 15 is divided into the center upper tube 40 and the center lower tube 39, and the rear end portion of the center upper tube 40 is integrally secured to the center lower tube 39 so that the rear half portion of the center lower tube 39 functions as the seat pillar. However, as shown in FIG. 7, it may be possible to form center main frame members 103, 103 each from a center upper tube 101 and a center lower tube 102 to be integrally with each other from one steel tube by bending it, and an independent seat pillar member 104 is connected to the rear portion of the center main frame 103.

Hereunder, functions and advantageous effects of the present invention of the structure mentioned above will be described.

The vehicle frame (structure) 2 is formed by coupling the front frame unit 14, the center frame unit 15 and the rear frame unit 16, which are preliminarily assembled per each unit and then assembled and coupled together. According to such assembling or manufacturing method, since each of the frame units is relatively small size, a welding torch or like jig is easily put into inside the unit at the time of welding the respective frame units, and it is hence possible to carry out the operational working automatically by such as utilizing a welding robot or mechanism, thus improving welding, assembling and like workability and reducing manufacturing cost.

Moreover, since the respective frame units 14, 15 and 16 are independently assembled and then coupled together, it is not necessary to move or transfer the frame structure having relatively large size in an intermediate assembled state as in a conventional technology, thus reducing working labor and improving the workability.

Furthermore, since the frame structure is coupled (for example, welded) after the respective frame units have been assembled, less welding strain is caused after the welding and, if caused, such welding strain will be easily removed.

Still furthermore, even in a case where the design change or modification of specification of, for example, an engine or a suspension stroke of a vehicle be required, it is not necessary to disassemble or change all the frame units and necessary only to change a required one, reducing welding working process and manufacturing cost.

Moreover, in the present invention, the front and center frame units are composed by a lateral pair of flat front main frame members and center main frame members and a plurality of coupling members disposed between these members. The respective main frame members are coupled together after the assembling with brackets, stays, reinforcing members and the like members, so that the working efficiency in the welding, assembling and like workings can be improved and automatic welding will be preferably applicable.

Furthermore, since the support members 34 and 37 of the steering shaft 11 are provided for the coupling members 32 and 36 connecting the lateral front main frame members 17, 17, the axis of the steering shaft 11 can be easily adjusted and the remedy of the welding strain can be also easily made.

Still furthermore, since the center lower tube 39, the front lower tube 18 and the front engine mounting tube 47 are connected so as to provide substantially a triangular shape in a plane view, the rigidity of the assembled vehicle body frame structure can be made strong.

Further, it is to be noted that the present invention is not limited to the described embodiment and many other changes and modifications may be made without departing from the scoped of the appended claims.

What is claimed is:

1. A frame structure of a body of a vehicle in which a front wheel, which is steered, is disposed in front of a vehicle body frame and a rear wheel disposed to the rear side thereof, an engine is arranged between the front and rear wheels, and a rider's seat is disposed at a rear upper portion of the vehicle body frame, said vehicle body frame structure comprising:

a front frame unit provided with a support member for a front wheel suspension device and a support member for a steering shaft;

a center frame unit provided with a support member for a rear wheel suspension device and an engine mounting member; and a rear frame unit supporting the rider's seat, said front, center and rear frame units being assembled respectively individually and then coupled together integrally.

2. A vehicle body frame structure according to claim 1, wherein said front frame unit comprises a pair of lateral flat front main frame members and a coupling member disposed so as to bridge the front main frame members, the support member of the front wheel suspension device is mounted to the front main frame members, and the support member of the steering shaft is mounted to the coupling member of the front frame unit.

3. A vehicle body frame structure according to claim 1, wherein said center frame unit comprises a pair of lateral flat center main frame members, each having a horizontally curved U-shape so as to surround the engine from upper, lower and rear sides, and a coupling member disposed between said center main frame members so as to integrally couple the center main frame members, said support member of the rear wheel suspension device is provided for the center main frame members and said engine mounting member is provided for the coupling member disposed between the center main frame members.

4. A vehicle body frame structure according to claim 3, wherein said center main frame members include center lower tubes, respectively, which have rear half portions extending obliquely rearward upward, rear ends of the extended rear half portions of the center lower tubes are connected to substantially central lower portions of seat rail tubes constituting the rear frame unit to thereby constitute the rear half portions of the center lower tubes as support members of the seat rail tubes, and a rear cushion bracket supporting a rear cushion unit of the rear wheel suspension device is provided for a coupling member disposed between rear end portions of the center lower tubes.

5. A vehicle body frame structure according to claim 3, wherein said front frame unit includes coupling members disposed to vertical rear end portions of the front main frame members so as to connect the front main frame members and the vertical front end portions of the center main frame members of the center frame unit are coupled to the front frame unit through said coupling members of the front frame unit.

6. A vehicle body frame structure according to claim 5, wherein said front main frame members of the front frame unit are connected at an upper end thereof to each other through the upper coupling member, to which the support member of said steering shaft is attached.

7. A vehicle body frame structure according to claim 5, wherein said front main frame members of the front frame unit are connected at a lower end thereof to each other through the lower coupling member, to which the engine mounting member is attached.

8. A vehicle body frame structure according to claim 7, wherein a lateral distance of the lower portion of the center frame unit is formed to be wider than a lateral distance of the lower portion of the front frame unit, the lower rear end portions of the front main frame members are connected to inside portions at both ends of said lower coupling member, the lower front end portions of the center frame unit are disposed so as to extend forward from said lower coupling member, the lower front portion of the center frame unit is bent inside in a width direction thereof, and the front end portion of the bent portion is connected to the rear end of the lower portion of the center frame unit from the outside in the width direction to thereby constitute the connecting portions between the lower portion of the front frame unit, the lower portion of the center frame unit and the lower coupling member so as to provide substantially a triangular shape in a plan view.

9. A method of manufacturing a body frame structure of a vehicle in which a front wheel, which is steered, is arranged in front of a vehicle body frame, a rear wheel is arranged on a rear side of the vehicle body frame, an engine is arranged between the front and rear wheels, and a rider's seat is disposed at a rear upper portion of the vehicle body frame, the manufacturing method comprising the steps of:

preparing a front frame unit provided with a support member of a front wheel suspension device and a support member of a steering shaft, a center frame unit provided with an engine mounting member and a rear frame unit supporting the rider's seat, said front, center and rear frame units being assembled independently; and coupling integrally said front, center and rear frame units after being assembled independently.

10. A method of manufacturing a body frame structure of a vehicle according to claim 9, wherein said front frame unit is composed of a pair of lateral flat front main frame members which are coupled through a coupling member disposed therebetween after being mounted with a bracket, a stay and a reinforcing member.

11. A method of manufacturing a body frame structure of a vehicle according to claim 9, wherein said center frame unit is composed of a pair of lateral flat front main frame members which are coupled through a coupling member disposed therebetween after being mounted with a bracket, a stay and a reinforcing member.

* * * * *